(12) United States Patent
Guen

(10) Patent No.: US 9,023,497 B2
(45) Date of Patent: *May 5, 2015

(54) SECONDARY BATTERY

(75) Inventor: Minhyung Guen, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/152,235

(22) Filed: Jun. 2, 2011

(65) Prior Publication Data

US 2012/0214030 A1    Aug. 23, 2012

Related U.S. Application Data

(60) Provisional application No. 61/444,545, filed on Feb. 18, 2011.

(51) Int. Cl.
| | |
|---|---|
| *H01M 2/00* | (2006.01) |
| *H01M 6/00* | (2006.01) |
| *H01M 10/00* | (2006.01) |
| *H01M 2/26* | (2006.01) |
| *H01M 2/28* | (2006.01) |
| *H01M 2/02* | (2006.01) |
| *H01M 4/02* | (2006.01) |
| *H01M 4/13* | (2010.01) |

(Continued)

(52) U.S. Cl.
CPC .............. *H01M 2/30* (2013.01); *H01M 2/0404* (2013.01); *H01M 2/34* (2013.01); *H01M 10/0436* (2013.01); *H01M 2200/20* (2013.01)

(58) Field of Classification Search
CPC ....... H01M 2/30; H01M 2/0404; H01M 2/34; H01M 10/0436; H01M 2200/20
USPC ............... 429/61, 122, 161, 163, 178, 209
See application file for complete search history.

(56) References Cited

U.S. PATENT DOCUMENTS

| | | |
|---|---|---|
| 5,523,178 A | 6/1996 | Murakami et al. |
| 5,707,756 A | 1/1998 | Inoue et al. |

(Continued)

FOREIGN PATENT DOCUMENTS

| | | | |
|---|---|---|---|
| EP | 1 076 350 A2 * | 2/2001 | ............. H01H 37/52 |
| EP | 2 284 932 A1 | 2/2001 | |

(Continued)

OTHER PUBLICATIONS

Extended European Search Report dated May 22, 2012 in corresponding European patent application No. 11179795.7 (5 pages).

(Continued)

*Primary Examiner* — Patrick Ryan
*Assistant Examiner* — Aaron Greso
(74) *Attorney, Agent, or Firm* — Christie, Parker & Hale, LLP

(57) ABSTRACT

A secondary battery includes an electrode assembly; a case housing the electrode assembly; a terminal electrically coupled to the electrode assembly, wherein the terminal includes a coupling part electrically coupled to the electrode assembly; and an extension part integral as a single piece with and extending from the coupling part; and a cap assembly sealing the case and comprising a cap plate and a short circuit plate, wherein the extension part at least partially covers the short circuit plate.

16 Claims, 6 Drawing Sheets

(51) Int. Cl.
  *H01M 2/30* (2006.01)
  *H01M 2/04* (2006.01)
  *H01M 2/34* (2006.01)
  *H01M 10/04* (2006.01)

(56) References Cited

U.S. PATENT DOCUMENTS

| | | | |
|---|---|---|---|
| 2005/0208345 A1* | 9/2005 | Yoon et al. | 429/7 |
| 2005/0214597 A1 | 9/2005 | Kim et al. | |
| 2006/0019531 A1* | 1/2006 | Moon | 439/501 |
| 2007/0166605 A1 | 7/2007 | Meguro et al. | |
| 2009/0258292 A1 | 10/2009 | Mushiga | |
| 2010/0266879 A1 | 10/2010 | Byun et al. | |
| 2010/0279156 A1 | 11/2010 | Kim et al. | |
| 2010/0323234 A1 | 12/2010 | Kim et al. | |
| 2011/0039136 A1* | 2/2011 | Byun et al. | 429/56 |
| 2011/0135976 A1 | 6/2011 | Byun | |
| 2011/0183193 A1 | 7/2011 | Byun et al. | |
| 2011/0300414 A1 | 12/2011 | Baek | |

FOREIGN PATENT DOCUMENTS

| | | |
|---|---|---|
| JP | 06-290767 | 10/1994 |
| JP | 09-106804 | 4/1997 |
| JP | 10-326610 | 12/1998 |
| JP | 11-007931 | 1/1999 |
| JP | 2003-092103 A | 3/2003 |
| JP | 2003-272574 A | 9/2003 |
| JP | 2004-111300 | 4/2004 |
| JP | 2010-073336 A | 4/2010 |
| KR | 2004-005242 * | 1/2004 |
| KR | 10-2005-0082424 A | 8/2005 |
| KR | 10-2008-0083441 A | 9/2008 |
| KR | 10-2010-0116028 | 10/2010 |
| KR | 10-2010-0137904 | 12/2010 |

OTHER PUBLICATIONS

KIPO Office action dated Dec. 18, 2012, for corresponding Korean Patent application 10-2011-0071889, (5 pages).
KIPO Office action dated Jan. 17, 2012, for Korean Patent application 10-2010-0068019, (9 pages).
KIPO Office action dated Jun. 21, 2012, for Korean Patent application 10-2011-0007282, (4 pages).
European Search report dated Oct. 13, 2010 for European Patent application 10169791.0, (6 pages).
European Office action dated Apr. 21, 2011, for European Patent application 10169791.0, (6 pages).
U.S. Office action dated Aug. 1, 2011, for cross reference U.S. Appl. No. 12/832,023, (now U.S. Patent 8,236,439 B2), (24 pages).
U.S. Notice of Allowance dated Apr. 23, 2012, for cross reference U.S. Appl. No. 12/832,023, (now U.S. Patent 8,236,439 B2), (11 pages).
U.S. Office action dated Dec. 21, 2012, for cross reference U.S. Appl. No. 13/067,768, (13 pages).
Patent Abstracts of Japan, and English machine translation of Japanese Publication 06-290767 (JP 3232767 dated Nov. 26, 2001), (13 pages).
Patent Abstracts of Japan, and English machine translation of Japanese Publication 10-326610 listed above, (12 pages).
Patent Abstracts of Japan, and English machine translation of Japanese Publication 11-007931 listed above, (14 pages).
Patent Abstracts of Japan, and English machine translation of Japanese Publication 2004-111300 listed above, (13 pages).
JP Office action, dated Aug. 13, 2013, for Japanese Patent Application No. 2011-188767, 3 pages.
Patent Abstracts of Japan and English Machine Translation of JP 2003-092103 A, 18 pages.
Patent Abstracts of Japan and English Machine Translation of JP 2003-272574 A, 12 pages.
Patent Abstracts of Japan and English Machine Translation of JP 2010-073336 A, 26 pages.

* cited by examiner

SECONDARY BATTERY

CROSS-REFERENCE TO RELATED APPLICATIONS

This application claims the benefit of U.S. Provisional Application No. 61/444,545, filed on Feb. 18, 2011, in the United States Patent and Trademark Office, the disclosure of which is incorporated herein by reference in its entirety.

BACKGROUND

1. Field

Embodiments of the present invention relate to a secondary battery.

2. Description of the Related Art

Secondary batteries are rechargeable, unlike primary batteries which are not. Types of secondary batteries include a low capacity battery having a battery cell in the form of a pack may be used in portable small electronic devices such as cellular phones and camcorders, and a high capacity battery including tens of battery cells connected to one another may be used as a power source for driving a motor, e.g., of electric scooters, hybrid vehicles, or electric vehicles.

The secondary batteries are manufactured in various shapes such as a cylindrical shape and a prismatic shape. An electrolyte and an electrode assembly formed by inserting a separator as an insulator between a positive electrode plate and a negative electrode plate are accommodated in a case, and a cap plate is installed on the case to form a secondary battery. The electrode assembly is connected with a positive terminal and a negative terminal which protrude through the cap plate and are exposed to the outside of the electrode assembly.

SUMMARY

An aspect of the present invention provides a secondary battery including a smaller number of parts, thereby reducing manufacturing costs, simplifying a manufacturing process, and improving the yields thereof.

Further, an aspect of the present invention provides a secondary battery which can prevent a short circuit due to external moisture and a corrosion of inner parts due to external moisture.

In one embodiment, a secondary battery includes an electrode assembly; a case housing the electrode assembly; a terminal electrically coupled to the electrode assembly, wherein the terminal includes a coupling part electrically coupled to the electrode assembly; and an extension part integral as a single piece with and extending from the coupling part; and a cap assembly sealing the case and comprising a cap plate and a short circuit plate, wherein the extension part at least partially covers the short circuit plate.

In one embodiment, the secondary battery also includes a collecting plate electrically coupled to the electrode assembly and a collecting terminal electrically coupled to the collecting plate and to the coupling part, wherein the collecting terminal may penetrate through the cap plate and through the coupling part.

Additionally, in one embodiment, the short circuit plate may have a reversible concave portion. The extension part has an opening aligned with the concave portion of the short circuit plate. Further, in one embodiment, the cap plate has a short circuit hole, and wherein a diameter of the opening of the extension part is smaller than a diameter of the short circuit hole. Additionally, the concave portion of the short circuit plate is configured to contact the extension part when the pressure within the battery reaches a threshold level.

In one embodiment, the secondary battery may also include a first insulating member between the cap plate and both the coupling part and the extension part, and the first insulating member may cover the extension part. In one embodiment, the first insulating member has a first protrusion, wherein the coupling terminal has an anti-rotation recess, and wherein the first protrusion is within the anti-rotation recess. Additionally, the first insulating member may include a second protrusion, wherein the cap plate has an anti-rotation recess, and wherein the second protrusion is within the anti-rotation recess.

In one embodiment, the cap plate has a sealing receiver recess extending around a periphery of the first insulating member. Additionally, the secondary battery may include a second insulation member between the cap plate and the electrode assembly and the second insulation member may include a protrusion, wherein the cap plate comprises a recess, and wherein the protrusion is within the recess. Further, in one embodiment, the first insulating member includes a bottom surface, a first side wall extending from the bottom surface, and a cover extending from the first side wall which provide a space configured to accommodate the extension part. Additionally, the first insulating member includes a second side wall, wherein a height of the first side wall is greater than a height of the second side wall. The cap plate may also includes a sealing receiver recess and wherein a portion of the first insulation member is within the sealing receiver recess. Additionally, the first insulating member may have an opening aligned with the concave portion of the short circuit plate.

Since the first coupling terminal includes the first coupling part and the first extension part which are integrally formed, the secondary battery of embodiments of the present invention does not require a separate part that contacts the short circuit plate when the inner pressure of the secondary battery is greater than a set pressure. Thus, the number of parts constituting the secondary battery according to the embodiment is minimized, thereby reducing the manufacturing cost, simplifying a manufacturing process, and improving the yields thereof.

In addition, since the secondary battery according to embodiments of the present invention includes the cap plate including the sealing receiver recess, and the upper insulation member including the first side wall and the second side wall, the sealing efficiency for sealing the space between the cap plate and the upper insulation member can be improved. Thus, the secondary battery according to the embodiment can prevent external moisture from forming a short circuit between the short circuit plate and the first extension part, and prevent corrosion of inner parts due to external moisture.

DETAILED DESCRIPTION

Example embodiments will now be described more fully hereinafter with reference to the accompanying drawings.

Figure 1:
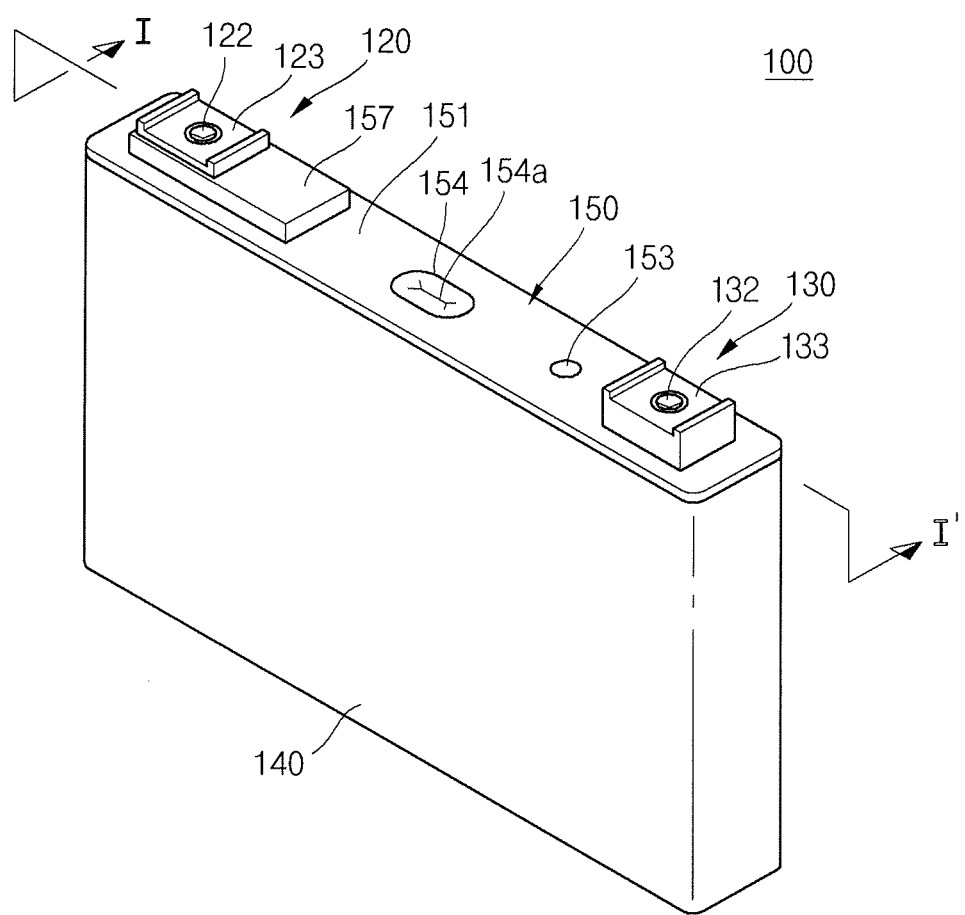
FIG. 1 is a perspective view illustrating a secondary battery according to an embodiment of the present invention.
Figure 2:
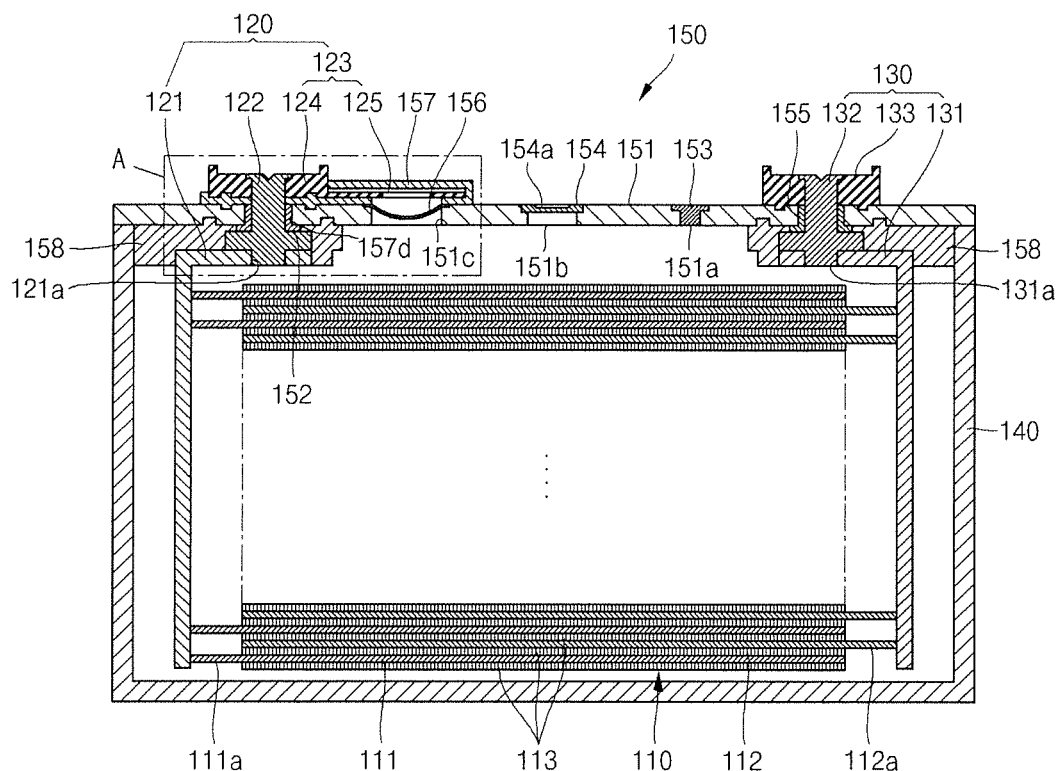
FIG. 2 is a cross-sectional view taken along line I-I' of FIG. 1.
Figure 3:
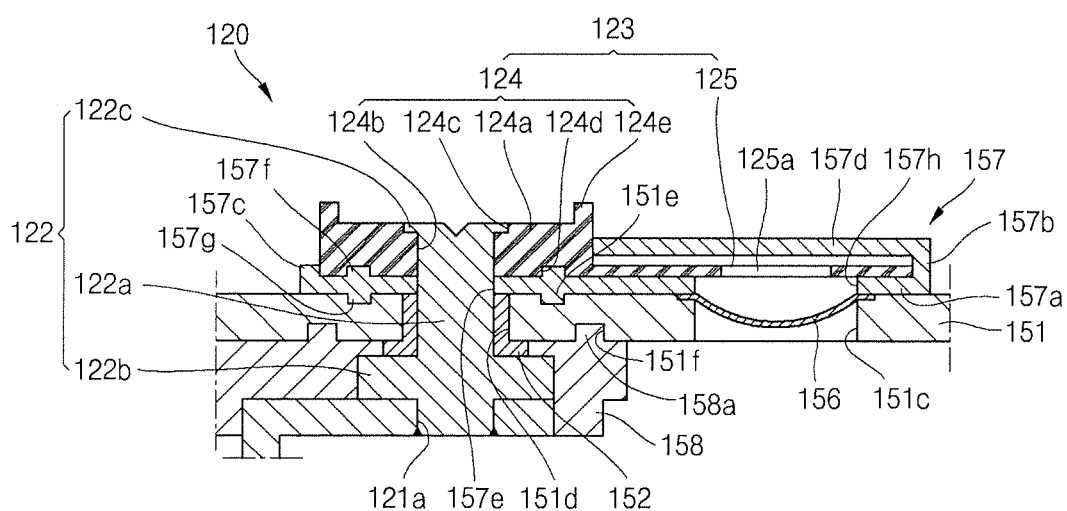
FIG. 3 is an enlarged view illustrating a portion A of FIG. 2.
Figure 4:
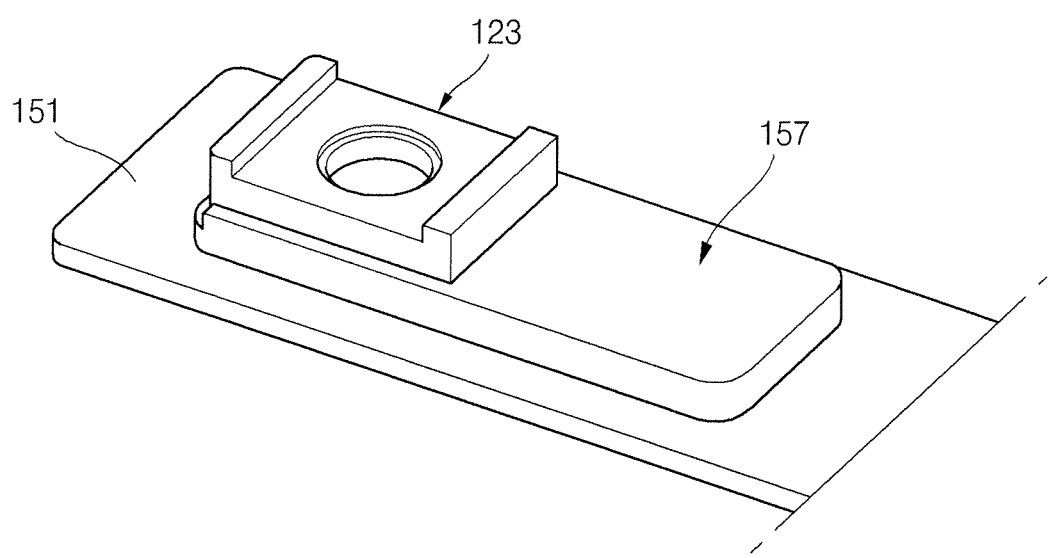
FIG. 4 is a perspective view illustrating a cap plate, a first coupling terminal, and an upper insulation member of FIG. 3 assembled together.
Figure 5:
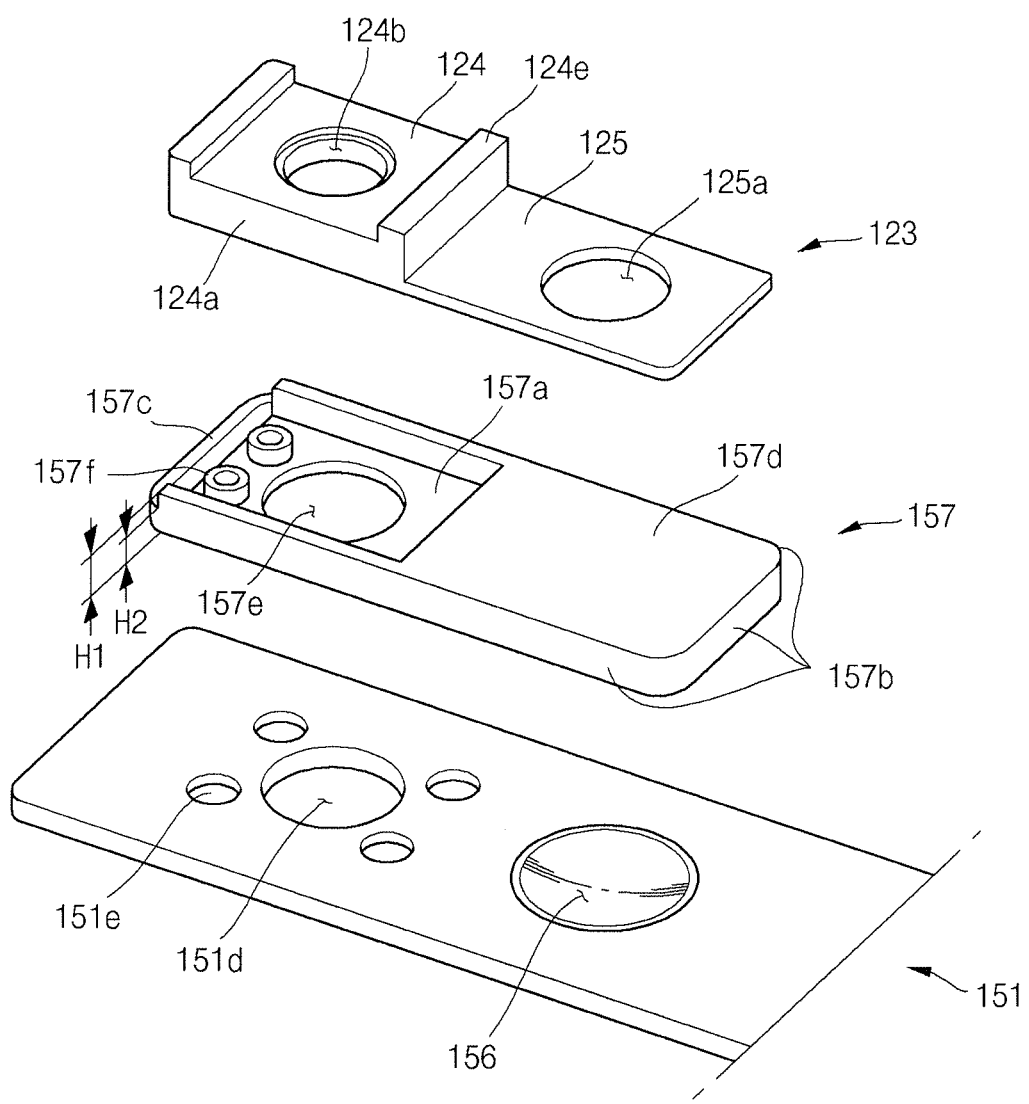
FIG. 5 is an exploded perspective view illustrating the cap plate, the first coupling terminal, and the upper insulation member of FIG. 4.

FIG. 1 is a perspective view illustrating a secondary battery according to an embodiment. FIG. 2 is a cross-sectional view taken along line I-I' of FIG. 1. FIG. 3 is an enlarged view illustrating a portion A of FIG. 2. FIG. 4 is a perspective view illustrating an assembly of a cap plate, a first coupling terminal, and an upper insulation member of FIG. 3. FIG. 5 is an exploded perspective view illustrating the cap plate, the first coupling terminal, and the upper insulation member as illustrated in FIG. 4.

Referring to FIGS. 1 through 5, a secondary battery 100 according to an embodiment includes an electrode assembly 110, a first terminal 120, a second terminal 130, a case 140, and a cap assembly 150.

The electrode assembly 110 is formed by winding or stacking a first electrode plate 111, a separator 113, and a second electrode plate 112, which have a thin plate or film shape. The first electrode plate 111 may function as a negative electrode and the second electrode plate 112 may function as a positive electrode. Alternatively, the first electrode plate 111 may function as a positive electrode and the second electrode plate 112 may function as a negative electrode.

The first electrode plate 111 is formed by applying a first electrode active material such as graphite or carbon on a first electrode collector formed of metal foil such as nickel or copper foil, and includes a first electrode non-coating portion 111a on which the first electrode active metal is not applied. The first electrode non-coating portion 111a functions as a passage for a current flowing between the first electrode plate 111 and the outside of the first electrode plate 111. The material of the first electrode plate 111 is not limited in the present invention.

The second electrode plate 112 is formed by applying a second electrode active material such as a transition metal oxide on a second electrode collector formed of metal foil such as aluminum foil, and includes a second electrode non-coating portion 112a on which the second electrode active metal is not applied. The second electrode non-coating portion 112a functions as a passage for a current flowing between the second electrode plate 112 and the outside of the second electrode plate 112. The material of the second electrode plate 112 is not limited in the present invention. The polarities of the first and second electrode plates 111 and 112 may be reversed.

The separator 113 is located between the first electrode plate 111 and the second electrode plate 112 to prevent a short circuit and allow the movement of lithium ions, and may be formed of polyethylene, polypropylene, or a combined film of polypropylene and polyethylene. However, the material of the separator 113 is not limited to those listed.

The electrode assembly 110 and electrolyte are housed in the case 140. The electrolyte may include an organic solvent such as ethylene carbonate (EC), propylene carbonate (PC), diethyl carbonate (DEC), ethyl methyl carbonate (EMC), or dimethyl carbonate (DMC), and a lithium salt such as $LiPF_6$ or $LiBF_4$. The electrolyte may be liquid, solid, or gel.

Both ends of the electrode assembly 110 are coupled with first and second electrode terminals 120 and 130 that are electrically connected respectively to the first and second electrode plates 111 and 112.

The first terminal 120 may be formed of a metal or an equivalent thereof, and is electrically connected to the first electrode plate 111. The first terminal 120 may include a first collecting plate 121, a first collecting terminal 122, and a first coupling terminal 123.

The first collecting plate 121 contacts the first electrode non-coating portion 111a protruding from an end of the electrode assembly 110. Substantially, the first collecting plate 121 is welded to the first electrode non-coating portion 111a. The first collecting plate 121 has an approximately "⌐" or upside down "L" shape, and a terminal hole 121a is formed in the upper portion thereof. The first collecting terminal 122 is fitted into the first terminal hole 121a. For example, the first collecting plate 121 may be formed of copper, a copper alloy, or an equivalent thereof. However, the material of the first collecting plate 121 is not limited thereto.

The first collecting terminal 122 passes through the cap plate 151, protrudes therefrom, and is electrically connected to the first collecting plate 121 at the lower side of the cap plate 151. For example, the first collecting terminal 122 may be formed of one of copper, copper alloy, or an equivalent thereof. However, the material of the first collecting terminal 122 is not limited thereto. In detail, the first connecting terminal 122 includes a first body 122a, a first flange 122b, and a first fixing part 122c.

The first body 122a includes an upper column protruding to the upper side of the cap plate 151, and a lower column connected to the lower portion of the upper column and extending to the lower side of the cap plate 151. The first body 122a may have a cylindrical shape, but the present invention is not limited thereto.

The first flange 122b extends horizontally from a side part of the lower column of the first body 122a and prevents the first collecting terminal 122 from being removed from the cap plate 151. A portion of the lower column of the first body 122a, which is connected to the lower portion of the first flange 122b, is fitted and welded to the first terminal hole 121a of the first collection plate 121.

The first fixing part 122c protrudes laterally from an end of the upper column constituting the first collecting terminal 122 and fixes the first collecting terminal 122 to the first coupling terminal 123. The first fixing part 122c may be formed by riveting the end of the upper column of the first collecting terminal 122.

The first coupling terminal 123 is spaced from the upper side of the cap plate 151, and more particularly is coupled to an upper insulation member (or a first insulating member) 157 located on the upper surface of the cap plate 151. The upper column of the first collecting terminal 122 passes through and is coupled to the first coupling terminal 123 that generally corresponds to a short circuit plate 156 installed in the cap plate 151. The first coupling terminal 123 includes a first coupling part 124 and a first extension part 125, wherein, in one embodiment, the first coupling part 124 is integrally formed as a single piece with the first extension part 125. In other words, the first coupling terminal 123 is made from a single piece of material and includes the first coupling part 124 and the first extension part 125. It will be appreciated that the first coupling terminal 123 could also be made from separate materials and attached together.

The first coupling terminal 123 is coupled to the first collecting terminal 122 through the first coupling part 124 and is electrically insulated from the cap plate 151 through the upper insulation member 157. The first extension part 125 of the first coupling terminal 123 may form a short circuit with the short circuit plate 156 when the short circuit plate is "activated" or reversed and protrudes upward when the inner pressure of the secondary battery 100 is greater than a set pressure. When the short circuit is formed, a large current flows through the secondary battery 100 to generate heat. As such, a fuse part formed on the first collection plate 121 or a second collection plate 131 is melted to cut off a current, thereby ensuring the safety of the secondary battery 100. For example, the first coupling terminal 123 may be formed of one of copper, copper alloy, aluminum, aluminum alloy, or an equivalent thereof.

The first coupling part 124 has an approximately tetragonal column shape, and includes a first coupling body 124a, a first collecting terminal hole 124b, a first fixing recess 124c, first rotation prevention recesses (or first anti-rotation recesses) 124d, and first coupling protrusions 124e.

The first coupling body 124a contacts the upper insulation member 157 and functions as a base to stably place the first coupling part 124 on the upper insulation member 157.

The first collecting terminal hole 124b extends from the upper surface of the first coupling body 124a to the lower surface thereof and provides a space through which the upper column of the first collecting terminal 122 passes.

The first fixing recess 124c is located in the upper end of the first coupling body 124a, has a diameter larger than the first collecting terminal hole 124b and provides a space for accommodating the first fixing part 122c.

The first rotation prevention recesses 124d are formed in the lower surface of the first coupling body 124a and are coupled to first protrusions 157f located on the upper insulation member 157. The first rotation prevention recesses 124d substantially prevent the rotation of the first coupling terminal 123 when the first collecting terminal 122 is coupled to the first coupling terminal 123.

The first coupling protrusions 124e are located on both sides on the upper portion of the first coupling body 124a, can facilitate the handling of the first coupling terminal 123, and may provide a space for coupling a structure to the first coupling terminal 123.

The first extension part 125 extends laterally from a lower edge of the first coupling body 124a to cover the short circuit plate 156. The first extension part 125 may have a hole (or an opening) 125a located in a region generally corresponding to (i.e., generally aligned with) the short circuit plate 156. When the short circuit plate 156 is reversed so that it protrudes away from the electrode assembly 110, the short circuit plate 156 contacts the edge of the hole 125a. The contact with the edge of the hole 125a increases a contact area between the short circuit plate 156 and the first extension part 125. Thus, when the inner pressure of the secondary battery 100 is larger than a set pressure, a short circuit can occur more quickly between the short circuit plate 156 and the first extension part 125.

Since the first coupling terminal 123 includes the first coupling part 124 and the first extension part 125 which are integrally formed, the number of parts constituting the secondary battery 100 is fewer than when a second battery includes a separate short circuit member between a collecting terminal and a coupling member to contact a reversed plate when the inner pressure of a secondary battery is greater than a set pressure. Thus, the first coupling terminal 123 makes it possible to simplify the manufacturing process for the secondary battery 100.

The second terminal 130 is formed of a metal or an equivalent thereof like the first terminal 120, and the second terminal 130 is connected to the second electrode plate 112. The second terminal 130 may include a second collecting plate 131, a second collecting terminal 132, and a second coupling terminal 133.

The second collecting plate 131 contacts the second electrode non-coating portion 112a protruding from another end of the electrode assembly 110. Substantially, the second collecting plate 131 is welded to the second electrode non-coating portion 112a. The second collecting plate 131 has an approximately "ㄱ" or upside down "L" shape, and a second terminal hole 131a is formed in the upper portion thereof. The second collecting terminal 132 is fitted and coupled to the second terminal hole 131a. For example, the second collecting plate 131 may be formed of one of aluminum, aluminum alloy, and an equivalent thereof. However, the material of the second collecting plate 131 is not limited thereto.

The second collecting terminal 132 passes through the cap plate 151, protrudes therefrom, and is electrically connected to the second collecting plate 131 at the lower side of the cap plate 151. For example, the second collecting terminal 132 may be formed of aluminum, an aluminum alloy, or an equivalent thereof. However, the material of the second collecting terminal 132 is not limited thereto. Since the second collecting terminal 132 is generally symmetrical to the first collecting terminal 122 with respect to the center of the cap plate 151, a description thereof will be omitted.

The second coupling terminal 133 is located on the upper portion of the cap plate 151. The upper column of the second collecting terminal 132 passes through and is coupled to the second coupling terminal 133 that has an approximately tetragonal column shape. The second coupling terminal 133 may be electrically and mechanically connected to the second collecting terminal 132. The second coupling terminal 133 may be formed of stainless steel, copper, a copper alloy, aluminum, an aluminum alloy, and an equivalent thereof, but the present invention is not limited thereto. Since the second coupling terminal 133 is symmetrical to the first coupling part 124 of the first coupling terminal 123 except for the first extension part 125 with respect to the center of the cap plate 151, a description thereof will be omitted.

The case 140 is formed of a conductive metal such as aluminum, an aluminum alloy, or steel plated with nickel, and has an approximately hexahedron shape provided with an opening through which the electrode assembly 110, the first terminal 120, and the second terminal 130 are inserted and placed. Although the opening is not shown in FIG. 2 since an assembly of the case 140 and the cap assembly 150 is illustrated in FIG. 2, a periphery of the cap assembly 150 substantially forms the opening. The inner surface of the case 140 is treated to be electrically insulated from the electrode assembly 110, the first and second terminals 120 and 130, and the cap assembly 150.

The cap assembly 150 is coupled to the case 140. In detail, the cap assembly 150 includes the cap plate 151, a sealing gasket 152, a plug 153, a safety vent 154, a connection plate 155, the short circuit plate 156, the upper insulation member 157, and a lower insulation member (or a second insulation member) 158.

The cap plate 151 seals the case 140, and may be formed of the same material as the case 140. The cap plate 151 may have an electrolyte injection hole 151a, a vent hole 151b, a short circuit hole 151c, and a collecting terminal hole 151d. Here, a diameter of the hole 125a of the extension part 125 is smaller than a diameter of the short circuit hole 151c. The cap plate 151 may have rotation prevention recesses (or ant-rotation recesses) 151e in the upper surface thereof, and coupling recesses (or recesses) 151f in the lower surface thereof. The cap plate 151 may be coupled to the case 140 through laser welding. Since the cap plate 151 may have the same polarity as the first electrode plate 111 and the first terminal 120, the cap plate 151 and the case 140 may have the same polarity.

The seal gasket 152 is formed of an electrically insulated material and is located between the first collecting terminal 122 and the cap plate 151 to seal the space between the first collecting terminal 122 and the cap plate 151. The seal gasket 152 substantially prevents the entry of moisture into the secondary battery 100 or the leakage of the electrolyte from the secondary battery 100.

The plug 153 closes the electrolyte injection hole 151a of the cap plate 151, and the safety vent 154 is installed in the vent hole 151b of the cap plate 151 and has a notch 154a openable at a set pressure.

The connection plate 155 is located in the cap plate 151 in a portion through which the second collecting terminal 132 passes. The connection plate 155 electrically connects the second collecting terminal 132 to the cap plate 151 and substantially prevents the entry of moisture into the secondary battery 100 or the leakage of the electrolyte from the secondary battery 100.

The short circuit plate 156 is installed in the short circuit hole 151c of the cap plate 151. The short circuit plate 156 may be a reversible plate that includes a round part (or a concave portion) and an edge part. The round part is formed to be convex downward (i.e., towards the electrode assembly 110) and the edge part is fixed to the cap plate 151. When the interior pressure of the secondary battery 100 becomes greater than a set pressure, the short circuit plate 156 is reversed and protrudes upward (i.e., away from the electrode assembly) and contacts the first extension part 125 of the first coupling terminal 123 to form a short circuit. The short circuit plate 156 has the same polarity as the cap plate 151.

The upper insulation member 157 is located between the first coupling terminal 123 and the cap plate 151 and accommodates the first coupling terminal 123. The upper insulation member 157 includes a bottom 157a, a first side wall 157b, a second side wall 157c, and a cover 157d. Further, the upper insulation member 157 includes a terminal through hole 157e, first protrusions 157f, second protrusions 157g, and an opening 157h.

The bottom 157a contacts the cap plate 151 and functions as a base for stably placing the upper insulation member 157 on the cap plate 151.

The first side wall 157b extends from edges of the bottom 157a, and substantially provides a space to accommodate the first coupling terminal 123 in the upper insulation member 157. In one embodiment, the first side wall 157b does not extend around an entire periphery of the bottom 157a, but rather only extends around three sides of the bottom 157a. The first side wall 157b has a height H1.

The second side wall 157c extends upward from an edge of the bottom 157a in a region that does not include the first side wall 157b and has a height H2 smaller than the height H1 of the first side wall 157b. The second side wall 157c facilitates insertion of the first extension part 125 of the first coupling terminal 123 to the upper insulation member 157.

The cover 157d is connected to a portion of the edge of the first side wall 157b to cover the first extension part 125 of the first coupling terminal 123 accommodated in the upper insulation member 157. The cover 157d is located at a position corresponding to the first extension part 125 of the first coupling terminal 123, wherein a portion corresponding the first coupling part 124 of the first coupling terminal 123 in the upper insulation member 157 is opened or exposed. The cover 157d may be parallel to the bottom 157a and is sized to generally correspond to the first extension part 125 of the first coupling terminal 123.

The terminal through hole 157e is located in the bottom 157a facing the cover 157d to accommodate the first collecting terminal 122.

The first protrusions 157f are located in the upper surface of the bottom 157a in regions adjacent to the terminal through hole 157e and are coupled to the first rotation prevention recesses 124d.

The second protrusions 157g are located in the lower surface of the bottom 157a in regions adjacent to the terminal through hole 157e and are coupled to the rotation prevention recesses 151e. The opening 157h is aligned with the round part of the short circuit plate 156.

The lower insulation member 158 is located between the cap plate 151 and each of the first and second collecting plates 121 and 131 to prevent an unnecessary short circuit. In other words, the lower insulation members 158 prevent a short circuit between the cap plate 151 and the first collecting plate 121, and a short circuit between the cap plate 151 and the second collecting plate 131. The lower insulation member 155 is also located between the cap plate 151 and each of the first and second collecting terminals 122 and 132 to prevent an unnecessary short circuit between the cap plate 151 and each of the first and second collecting terminals 122 and 132. The lower insulation member 158 may include protrusions 158a that are formed on the upper surface thereof and are coupled to the coupling recesses 151f of the cap plate 151.

Since the first coupling terminal 123 includes the first coupling part 124 and the first extension part 125 which are integrally formed as a single piece, the secondary battery 100 does not require a separate part that contacts the short circuit plate 156 when the inner pressure of the secondary battery 100 becomes greater than a set pressure.

Thus, the number of parts constituting the secondary battery according to the embodiment is minimized, thereby reducing the manufacturing cost, simplifying a manufacturing process, and improving the yields thereof.

Figure 6:
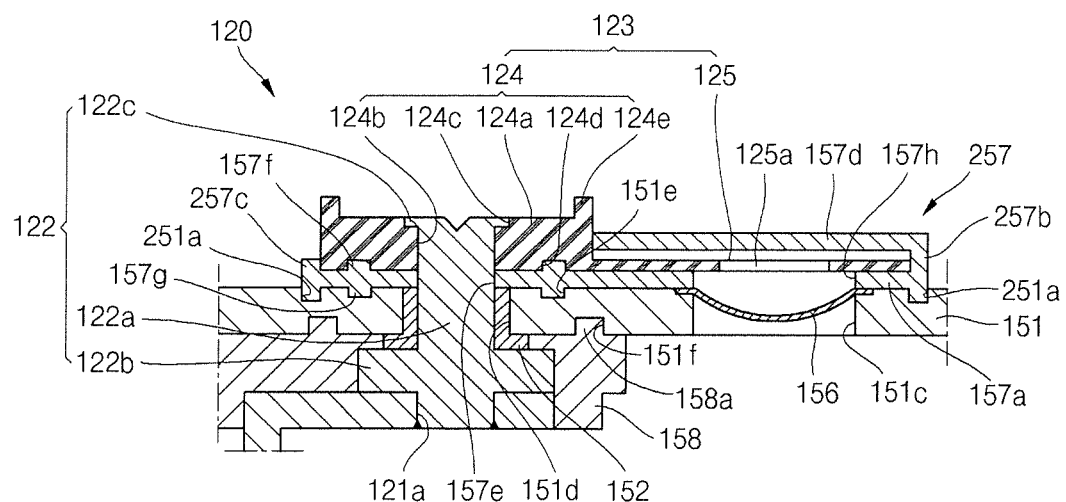
FIG. 6 is a cross-sectional view illustrating a part of a secondary battery according to another embodiment of the present invention.
Figure 7:
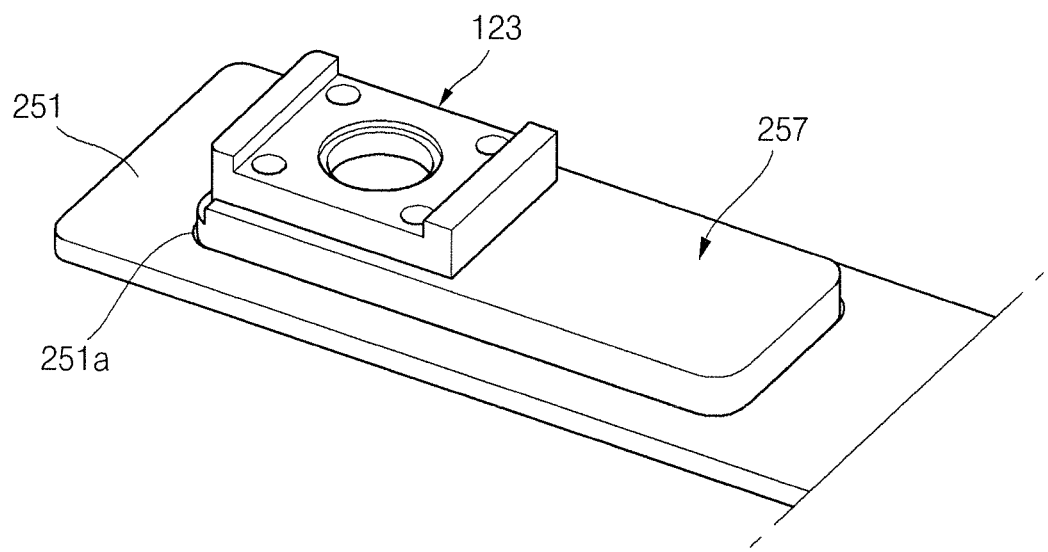
FIG. 7 is a perspective view illustrating a state where a cap plate, a first coupling terminal, and an upper insulating member of FIG. 6. are assembled.
Figure 8:
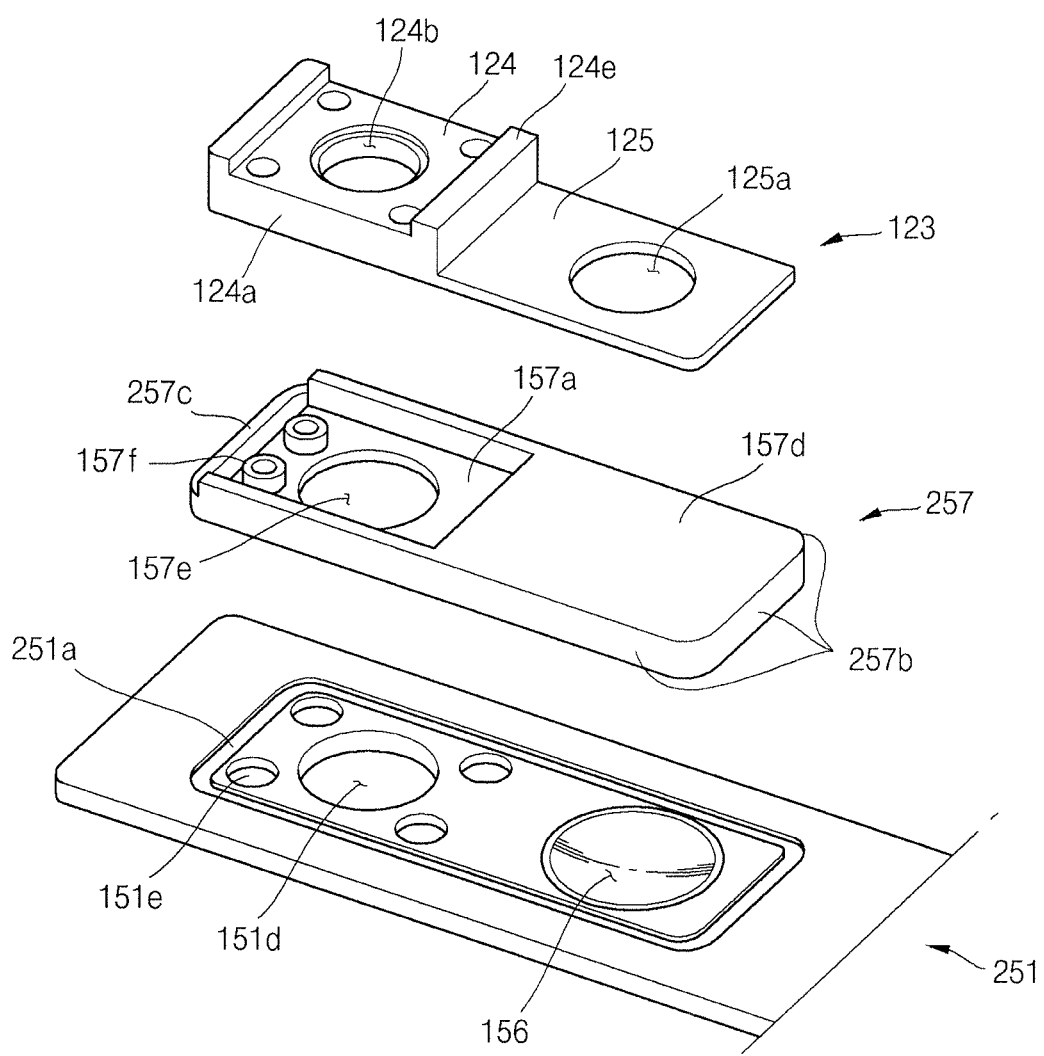
FIG. 8 is an exploded perspective view illustrating the cap plate, the first coupling terminal, and the upper insulation member of FIG. 7.

FIG. 6 is a cross-sectional view illustrating a part of a secondary battery according to another embodiment. FIG. 7 is a perspective view illustrating an assembled cap plate, first coupling terminal, and upper insulating member of FIG. 6. FIG. 8 is an exploded perspective view illustrating the cap plate, the first coupling terminal, and the upper insulation member as illustrated in FIG. 7.

A secondary battery according to an embodiment has generally the same configuration as the secondary battery 100 of FIG. 2 except for a cap plate 251 and an upper insulation member 257. Thus, an illustration and a description of the same configuration will be omitted, and the cap plate 251 and the upper insulation member 257 will be primarily described.

The cap plate 251 is similar to the cap plate 151. However, the cap plate 251 includes a sealing receiver recess 251a in the upper surface thereof. A first side wall 257b of the upper insulation member 257 and a second side wall 257c thereof are partially fitted into the sealing receiver recess 251a. The sealing receiver recess 251a improves physical coupling force of the cap plate 251 and the upper insulation member 257, and sealing efficiency for sealing the space between the cap plate 251 and the upper insulation member 257. Thus, external moisture between the cap plate 251 and the upper insulation member 257 can be prevented from creating a short circuit between the short circuit plate 156 and the first extension part 125, and corrosion of internal components due to external moisture can be significantly prevented.

The upper insulation member 257 is similar to the upper insulation member 157. However, the first and second side walls 257b and 257c of the upper insulation member 257 further extend downward toward the electrode assembly from the bottom 157a. Thus, the first and second side walls 257b and 257c extending downward from the bottom 157a can be partially accommodated in the sealing receiver recess 251a of the cap plate 251.

As described above, since the secondary battery according to the current embodiment includes the cap plate 251 including the sealing receiver recess 251a, and the upper insulation member 257 including the first side wall 257b and the second side wall 257c, sealing efficiency for sealing the space between the cap plate 251 and the upper insulation member 257 can be improved.

Thus, the secondary battery according to the current embodiment can prevent external moisture from creating a short circuit between the short circuit plate 156 and the first extension part 125, and prevent corrosion of inner parts.

Although the present invention has been described with reference to the preferred examples, the foregoing disclosure should be interpreted as illustrative only and it should be understood that various modifications and equivalent embodiments can be easily made by those skilled in the art without departing from the spirit of the invention. Accordingly, the true scope and spirit of the invention should be defined by the following claims.

DESCRIPTION OF THE SYMBOLS IN MAIN PORTIONS OF THE DRAWINGS

| | |
|---|---|
| 100: Secondary battery | 110: Electrode assembly |
| 120: First terminal | 121: First collecting plate |
| 122: First collecting terminal | 123: First coupling terminal |
| 124: First coupling part | 125: First extension part |
| 130: Second terminal | 131: Second collecting plate |
| 132: Second collecting terminal | 133: Second coupling terminal |
| 140: Case | 150: Cap assembly |
| 151, 251: Cap plate | 152: Sealing gasket |
| 153: Plug | 154: Safety vent |
| 155: Connection plate | 156: Short circuit plate |
| 157, 257: Upper insulation member | 158: Lower insulation member |
| 251a: Sealing receiver recess | |

What is claimed is:

1. A secondary battery comprising:
   an electrode assembly;
   a case housing the electrode assembly;
   a terminal electrically coupled to the electrode assembly, wherein the terminal comprises:
      a coupling part electrically coupled to the electrode assembly; and
      an extension part integral as a single piece with and extending from the coupling part;
   a first insulating member between the cap plate and the terminal, wherein the first insulating member directly contacts and entirely covers the extension part; and
   a cap assembly sealing the case and comprising a cap plate and a short circuit plate, wherein the extension part at least partially covers the short circuit plate.

2. The secondary battery of claim 1, further comprising a collecting plate electrically coupled to the electrode assembly and a collecting terminal electrically coupled to the collecting plate and to the coupling part.

3. The secondary battery of claim 2, wherein the collecting terminal penetrates through the cap plate and through the coupling part.

4. The secondary battery of claim 1, wherein the short circuit plate has a reversible concave portion.

5. The secondary battery of claim 4, wherein the extension part has an opening aligned with the concave portion of the short circuit plate.

6. The secondary battery of claim 5, wherein the cap plate has a short circuit hole, and wherein a diameter of the opening of the extension part is smaller than a diameter of the short circuit hole.

7. The secondary battery of claim 5, wherein the concave portion of the short circuit plate is configured to contact the extension part when the pressure within the battery reaches a threshold level.

8. The secondary battery of claim 1, wherein the first insulating member comprises a first protrusion, wherein the terminal has an anti-rotation recess, and wherein the first protrusion is within the anti-rotation recess.

9. The secondary battery of claim 1, wherein the first insulating member comprises a second protrusion, wherein the cap plate has an anti-rotation recess, and wherein the second protrusion is within the anti-rotation recess.

10. The secondary battery of claim 1, wherein the cap plate has a sealing receiver recess extending around a periphery of the first insulating member.

11. The secondary battery of claim 1, further comprising a second insulation member between the cap plate and the electrode assembly.

12. The secondary battery of claim 11, wherein the second insulation member comprises a protrusion, wherein the cap plate comprises a recess, and wherein the protrusion is within the recess.

13. The secondary battery of claim 1, wherein the first insulating member comprises a bottom surface, a first side wall extending from the bottom surface, and a cover extending from the first side wall which provide a space configured to accommodate the extension part.

14. The secondary battery of claim 13, wherein the first insulating member further comprises a second side wall, wherein a height of the first side wall is greater than a height of the second side wall.

15. The secondary battery of claim 1, wherein the cap plate includes a sealing receiver recess and wherein a portion of the first insulation member is within the sealing receiver recess.

16. The secondary battery of claim 1, wherein the first insulating member has an opening aligned with a concave portion of the short circuit plate.

* * * * *